US008828891B2

(12) United States Patent
Sakamoto

(10) Patent No.: US 8,828,891 B2
(45) Date of Patent: Sep. 9, 2014

(54) LASER PROCESSING METHOD

(75) Inventor: Takeshi Sakamoto, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 0 days.

(21) Appl. No.: 13/575,393

(22) PCT Filed: Jan. 5, 2011

(86) PCT No.: PCT/JP2011/050055
§ 371 (c)(1),
(2), (4) Date: Aug. 22, 2012

(87) PCT Pub. No.: WO2011/093113
PCT Pub. Date: Aug. 4, 2011

(65) Prior Publication Data
US 2012/0329247 A1    Dec. 27, 2012

(30) Foreign Application Priority Data

Jan. 27, 2010 (JP) ................................ P2010-015538

(51) Int. Cl.
*H01L 21/26* (2006.01)
*H01L 21/42* (2006.01)
*H01L 21/324* (2006.01)
*H01L 21/477* (2006.01)

(52) U.S. Cl.
USPC ............ 438/795; 257/E21.214; 257/E21.237; 257/E21.347; 257/E21.483; 257/E21.596; 438/33; 438/68; 438/113; 438/458; 438/460; 438/463

(58) Field of Classification Search
USPC .................. 257/E21.214, E21.237, E21.347, 257/E21.483, E21.596; 438/33, 68, 113, 438/458, 460, 463, 795
See application file for complete search history.

(56) References Cited

U.S. PATENT DOCUMENTS

| | | | | |
|---|---|---|---|---|
| 2008/0000884 | A1* | 1/2008 | Sugiura et al. | 219/121.67 |
| 2009/0008373 | A1* | 1/2009 | Muramatsu et al. | 219/121.85 |
| 2009/0107967 | A1* | 4/2009 | Sakamoto et al. | 219/121.72 |
| 2009/0250446 | A1* | 10/2009 | Sakamoto | 219/121.72 |
| 2009/0302428 | A1* | 12/2009 | Sakamoto et al. | 257/620 |
| 2010/0009547 | A1* | 1/2010 | Sakamoto | 438/795 |
| 2010/0012632 | A1* | 1/2010 | Sakamoto | 219/121.72 |

(Continued)

FOREIGN PATENT DOCUMENTS

| | | |
|---|---|---|
| CN | 101444875 | 6/2009 |
| CN | 101585113 | 11/2009 |

(Continued)

*Primary Examiner* — Asok K Sarkar
(74) *Attorney, Agent, or Firm* — Drinker Biddle & Reath LLP

(57) ABSTRACT

For modulating laser light for forming a modified region SD3 at an intermediate position between a position closer to a rear face 21 and a position closer to a front face 3 with respect to an object 1, a quality pattern J having a first brightness region extending in a direction substantially orthogonal to a line 5 and second brightness regions located on both sides of the first brightness region in the extending direction of the line 5 is used. After forming modified regions SD1, SD2 at positions closer to the rear face 21 but before forming modified regions SD4, SD5 at positions closer to the rear face 21 while using the front face 3 as a laser light entrance surface, the modified region SD3 is formed at the intermediate position by irradiation with laser light modulated according to a modulation pattern including the quality pattern J.

9 Claims, 20 Drawing Sheets

(56) References Cited

U.S. PATENT DOCUMENTS

| | | | |
|---|---|---|---|
| 2010/0178751 A1* | 7/2010 | Sakamoto et al. | 438/462 |
| 2010/0184271 A1* | 7/2010 | Sugiura et al. | 438/463 |
| 2010/0227453 A1* | 9/2010 | Sakamoto | 438/463 |
| 2011/0001220 A1* | 1/2011 | Sugiura et al. | 257/618 |
| 2011/0300691 A1* | 12/2011 | Sakamoto et al. | 438/462 |
| 2011/0303646 A1* | 12/2011 | Sakamoto | 219/121.72 |
| 2011/0309060 A1* | 12/2011 | Iwaki et al. | 219/121.72 |
| 2011/0316200 A1* | 12/2011 | Iwaki et al. | 264/400 |
| 2012/0006799 A1* | 1/2012 | Sugiura et al. | 219/121.72 |
| 2012/0067857 A1* | 3/2012 | Sakamoto et al. | 219/121.72 |
| 2012/0119334 A1* | 5/2012 | Nakagawa et al. | 257/620 |
| 2012/0327501 A1* | 12/2012 | Sakamoto et al. | 359/290 |
| 2012/0329247 A1* | 12/2012 | Sakamoto | 438/462 |
| 2013/0168831 A1* | 7/2013 | Sakamoto et al. | 257/620 |

FOREIGN PATENT DOCUMENTS

| | | |
|---|---|---|
| EP | 1 338 371 | 8/2003 |
| JP | 2002-207202 | 7/2002 |
| JP | 2006-108459 | 4/2006 |
| JP | 2006-167804 | 6/2006 |
| JP | 2009-10105 | 1/2009 |
| JP | 2009-34723 | 2/2009 |
| JP | 2010-542 | 1/2010 |
| JP | 2010-012494 | 1/2010 |

\* cited by examiner

Fig.9
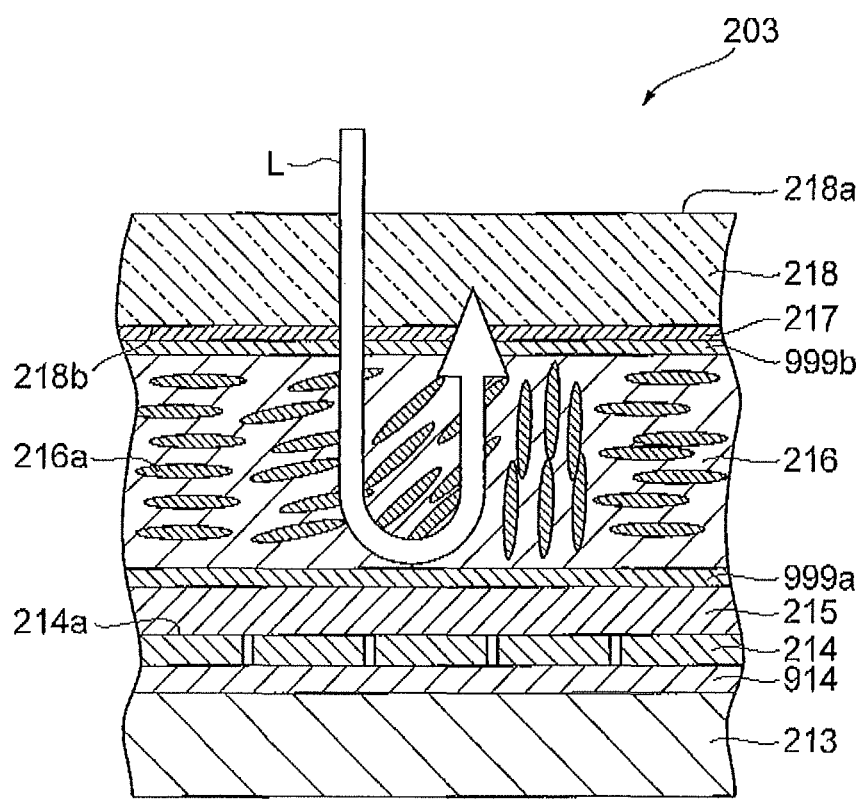
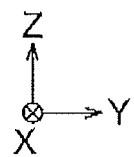

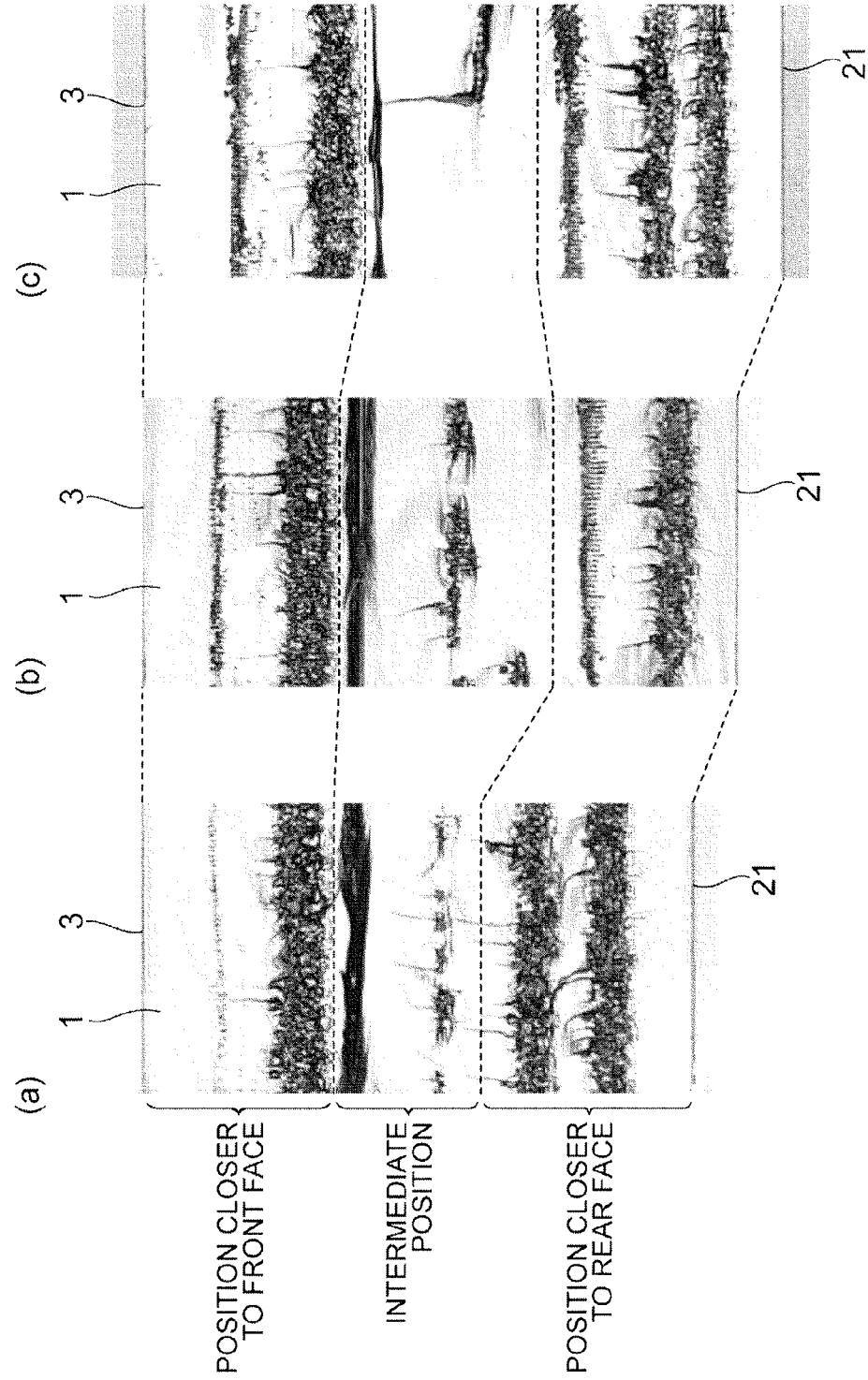

LASER PROCESSING METHOD

TECHNICAL FIELD

The present invention relates to a laser processing method for forming a modified region in an object to be processed.

BACKGROUND ART

Known as a conventional laser processing method in the technical field mentioned above is one which irradiates a planar object to be processed with laser light having a wavelength of 1300 nm, so as to form a modified region to become a starting point region for cutting in the object along a line to cut the object (see, for example, Patent Literature 1).

CITATION LIST

Patent Literature

Patent Literature 1: Japanese Patent Application Laid-Open No. 2006-108459

SUMMARY OF INVENTION

Technical Problem

Here, when the object is a silicon substrate, for example, it exhibits a higher transmittance for the laser light having a wavelength of 1300 nm than for laser light having a wavelength of 1064 nm, whereby a modified region which is easy to generate fractures can be formed by using the laser light having a wavelength of 1300 nm even at a position located deep from the laser entrance surface of the object. This can reduce the number of rows of modified regions when cutting the object by forming a plurality of rows of modified regions in the thickness direction of the object along a line to cut, thereby shortening takt time.

While the use of the laser light having a wavelength of 1300 nm can form modified regions which are easy to generate fractures, the fractures may continuously advance in the thickness direction of the object when forming a plurality of rows of modified regions in the thickness direction of the object, so as to meander on a main face of the object and so forth, thereby lowering the accuracy in cutting the object.

It is therefore an object of the present invention to provide a laser processing method which can reduce the number of rows of modified regions formed in the thickness direction of the object while preventing the accuracy in cutting the object from lowering.

Solution to Problem

For achieving the above-mentioned object, the laser processing method in accordance with the present invention is a laser processing method of irradiating a planar object to be processed with laser light so as to form a modified region to become a starting point region for cutting in the object along a line to cut the object; wherein, when relatively moving a converging point of the laser light along the line while using one main face of the object as a laser light entrance surface, so as to form modified regions at a position closer to the other main face of the object, a position closer to the one main face, and an intermediate position between the position closer to the other main face and the position closer to the one main face, for forming the modified region at the intermediate position after forming the modified region at the position closer to the other main face but before forming the modified region at the position closer to the one main face, the laser light is modulated by a spatial light modulator according to a modulation pattern including a quality pattern having a first brightness region extending in a direction intersecting the line and second brightness regions adjacent to both sides of the first brightness region in an extending direction of the line.

After forming the modified region at the position closer to the other main face but before forming the modified region at the position closer to the one main face, this laser processing method forms the modified region at the intermediate position between the position closer to the other main face and the position closer to the one main face by irradiation with the laser light modulated by the spatial light modulator according to the modulation pattern including the quality pattern mentioned above. Even when laser light having a wavelength longer than 1064 nm is used in order to reduce the number of rows of modified regions, for example, thus forming the modified region at the intermediate position can prevent fractures from continuously advancing in the thickness direction of the object at the time of forming a plurality of rows of modified regions in the thickness direction of the object. When a stress is generated in the object, for example, a fracture occurring from the modified region acting as a start point extends in the thickness direction of the object more easily than in the case where no modified region is formed at the intermediate position, whereby the object can be cut accurately along the line. Hence, this laser processing method can reduce the number of rows of modified regions formed in the thickness direction of the object along the line, while preventing the accuracy in cutting the object from lowering.

By forming a modified region at a position closer to the other main face is meant that the modified region is formed such that the center position of the modified region is shifted from the center position of the object to the other main face, whereas by forming a modified region at a position closer to the one main face is meant that the modified region is formed such that the center position of the modified region is shifted from the center position of the object to the one main face. By forming a modified region at an intermediate position between the position closer to the other main face and the position closer to the one main face is meant that the modified region is formed between the modified region formed at the position closer to the other main face and the modified region formed at the position closer to the one main face (i.e., it does not mean that the modified region is formed such that its center position coincides with the center position of the object in the thickness direction of the object).

Here, in the extending direction of the line, the width of the first brightness region is preferably at a ratio of 20% to 50% of the width of an effective region for modulating the laser light in the modulation pattern. In this case, a modified region which can reliably prevent fractures from continuously advancing in the thickness direction of the object when forming a plurality of rows of modified regions in the thickness direction of the object can be formed at the intermediate position.

In the extending direction of the line, the width of the first brightness region may be narrower or wider than the width of each of the second brightness regions. In either case, a modified region which can reliably prevent fractures from continuously advancing in the thickness direction of the object when forming a plurality of rows of modified regions in the thickness direction of the object can be formed at the intermediate position.

Preferably, the modulation pattern includes the quality pattern, an individual difference correction pattern for correcting an individual difference occurring in a laser processing device, and a spherical aberration correction pattern for correcting a spherical aberration occurring according to a material of the object and a distance from the laser light entrance surface of the object to the converging point when forming the modified region at the intermediate position, and the laser light is modulated by a spatial light modulator according to a modulation pattern including the individual difference correction pattern and spherical aberration correction pattern when forming the modified regions at the position closer to the other main face and the position closer to the one main face. In this case, the modified regions formed at the intermediate position and the positions closer to the other main face and the one main face are easier to generate fractures, whereby the number of rows of modified regions formed in the thickness direction of the object along the line can be reduced more reliably.

Preferably, the laser light has a wavelength of 1080 nm or longer. This makes the object exhibit a higher transmittance for the laser light, so that the modified regions formed at the intermediate position, the position closer to the other main face, and the position closer to the one main face are easier to generate fractures, whereby the number of rows of modified regions formed in the thickness direction of the object along the line can be reduced more reliably.

Cutting the object along the line from the above-mentioned modified regions acting as a start point can accurately cut the object along the line. Manufacturing a semiconductor device by cutting the object can yield a highly reliable semiconductor device.

Advantageous Effects of Invention

The present invention can reduce the number of rows of modified regions formed in the thickness direction of the object while preventing the accuracy in cutting the object from lowering.

BRIEF DESCRIPTION OF DRAWINGS

FIG. 9 is a partial sectional view of a reflective spatial light modulator in FIG. 8;

FIG. 20 is a sixth diagram illustrating a cut section obtained when cutting the object from modified regions acting as a start point.

DESCRIPTION OF EMBODIMENTS

Figure 1:
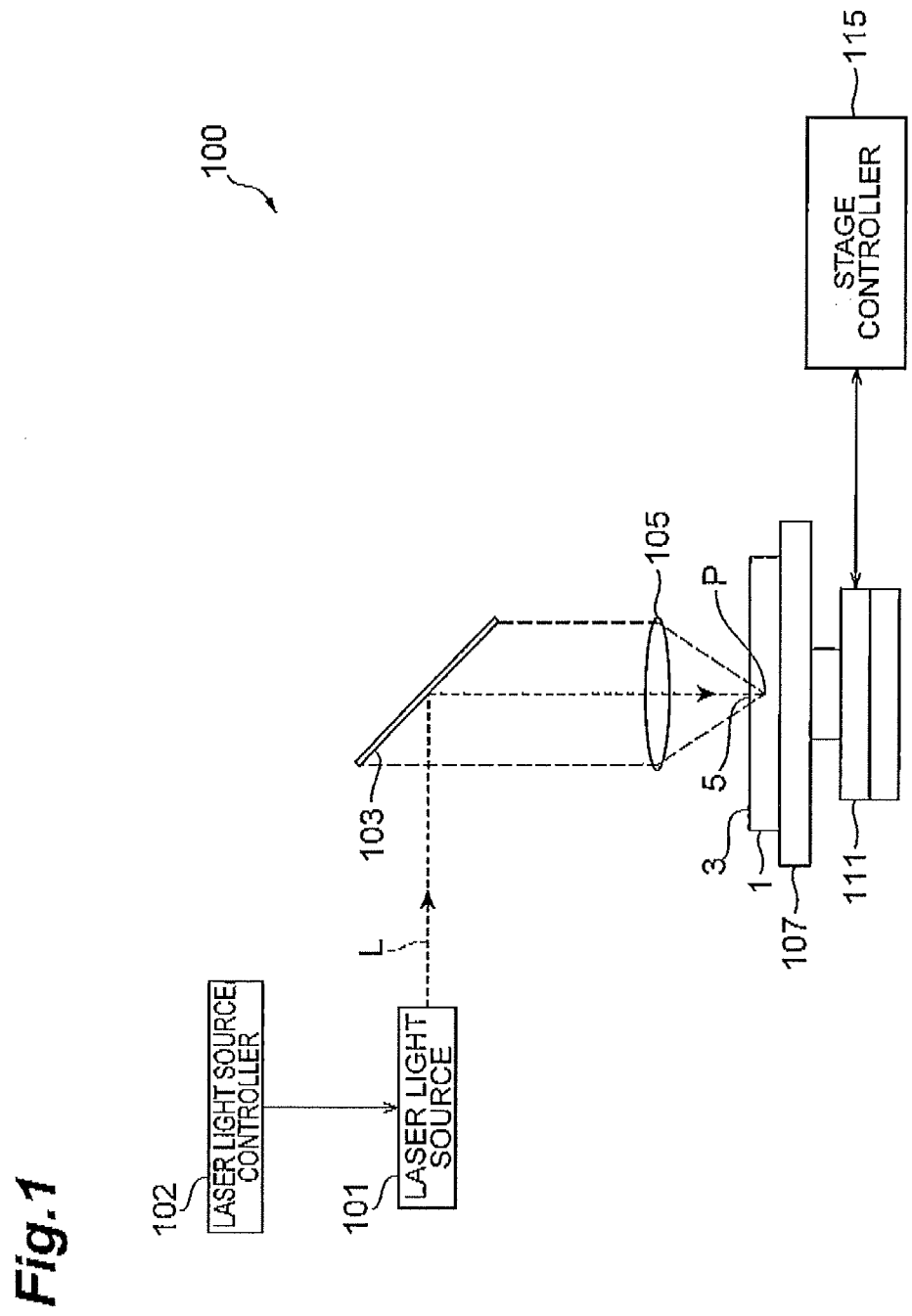
FIG. 1 is a structural diagram of a laser processing device used for forming a modified region.

In the following, preferred embodiments of the present invention will be explained in detail with reference to the drawings. In the drawings, the same or equivalent constituents will be referred to with the same signs while omitting their overlapping descriptions.

Before explaining an embodiment of the laser processing method in accordance with the present invention, forming of a modified region for an object to be processed will be described with reference to FIGS. 1 to 6. As illustrated in FIG. 1, a laser processing device 100 comprises a laser light source 101 which causes laser light L to oscillate in a pulsating manner, a dichroic mirror 103 arranged such as to change the direction of the optical axis (optical path) of the laser light L by 90°, and a condenser lens 105 for converging the laser light L. The laser processing device 100 also comprises a support table 107 for supporting an object to be processed 1 irradiated with the laser light L converged by the condenser lens 105, a stage 111 for moving the support table 107, a laser light source controller 102 for controlling the laser light source 101 in order to regulate the output, pulse width, and the like of the laser light L, and a stage controller 115 for controlling the movement of the stage 111.

In the laser processing device 100, the laser light L emitted from the laser light source 101 changes the direction of its optical axis by 90° with the dichroic mirror 103 and then is converged by the condenser lens 105 into the object 1 mounted on the support table 107. At the same time, the stage 111 is shifted, so that the object 1 moves relative to the laser light L along a line to cut 5. This forms a modified region in the object 1 along the line 5.

Figure 2:
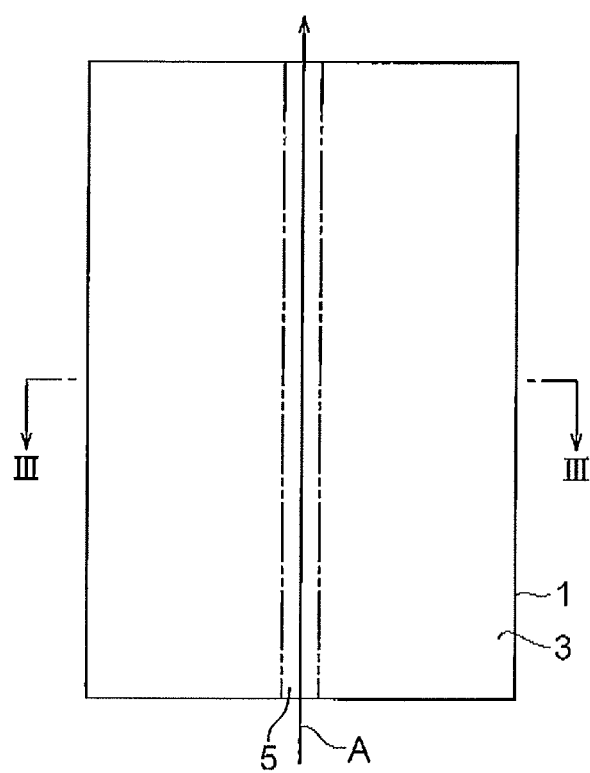
FIG. 2 is a plan view of an object to be processed in which the modified region is to be formed.
Figure 3:
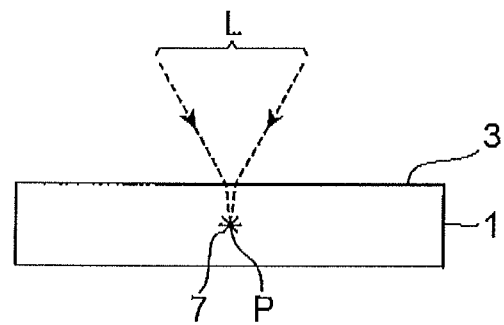
FIG. 3 is a sectional view of the object taken along the line III-III of FIG. 2.
Figure 4:
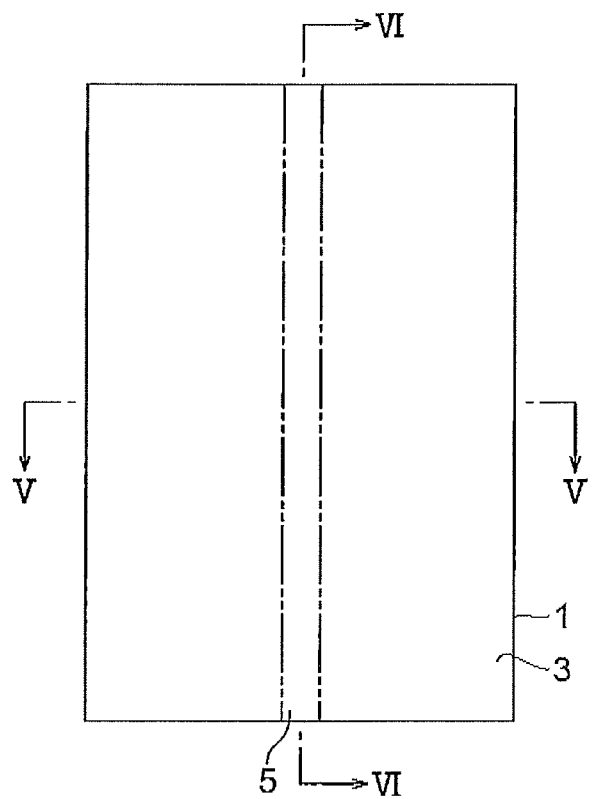
FIG. 4 is a plan view of the object after forming the modified region.
Figure 5:
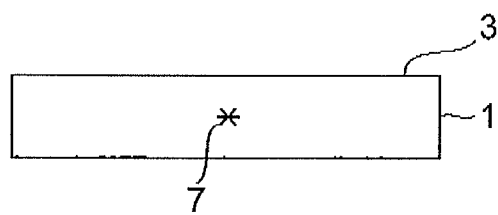
FIG. 5 is a sectional view of the object taken along the line V-V of FIG. 4.
Figure 6:
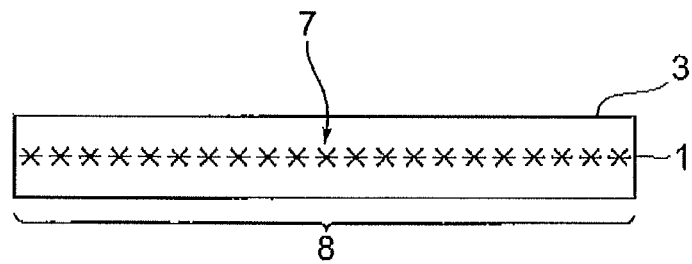
FIG. 6 is a sectional view of the object taken along the line VI-VI of FIG. 4.

A semiconductor material, a piezoelectric material, or the like is used as a material for the object 1, while the line 5 for cutting the object 1 is set therefor as illustrated in FIG. 2. Here, the line 5 is a virtual line extending straight. When forming a modified region within the object 1, the laser light L is relatively moved along the line 5 (i.e., in the direction of arrow A in FIG. 2) while locating a converging point (converging position) P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight or a line actually drawn on a front face 3 of the object 1 without being restricted to the virtual line. The modified region 7 may be formed either continuously or intermittently. The modified region 7 may be formed like lines or dots; it will be sufficient if the modified region 7 is formed at least within the object 1. There are cases where fractures are formed from the modified region 7 acting as a start point, and the fractures and modified region 7 may be exposed at outer surfaces (the front face, rear face, and outer peripheral face) of the object 1.

Here, the laser light L is absorbed in particular in the vicinity of the converging point within the object 1 while being transmitted therethrough, whereby the modified region 7 is formed in the object 1 (i.e., internal absorption type laser processing). Hence, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face side in general.

By the modified region are meant regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Further examples of the modified region 7 include an area where the density has changed from that of an unmodified region in a material of the object and an area formed with a lattice defect (which may collectively be referred to as a high-density transitional region).

The molten processed regions, refractive index changed regions, areas where the modified region has a density different from that of the unmodified region, or areas formed with a lattice defect may further incorporate a fracture (microcrack) therewithin or at an interface between the modified region and an unmodified region. The incorporated fracture may be formed over the whole surface of the modified region or in only a part or a plurality of parts thereof. Examples of the object 1 include those containing or constituted by silicon, glass, $LiTaO_3$, and sapphire ($Al_2O_3$).

Here, a plurality of modified spots (processing scars) are formed along the line 5, so as to produce the modified region 7. The modified spots, each of which is a modified part formed by a shot of one pulse of pulsed laser light (i.e., one pulse of laser irradiation: laser shot), gather to form the modified region 7. Examples of the modified spots include crack spots, molten processed spots, refractive index changed spots, and those mixed with at least one of them. As for the modified spots, it will be preferred if their size and the length of fractures generated thereby are controlled as appropriate in view of required accuracy in cutting, required flatness in the cut section, thickness, kind, and crystal orientation of the object, and the like.

Figure 7:
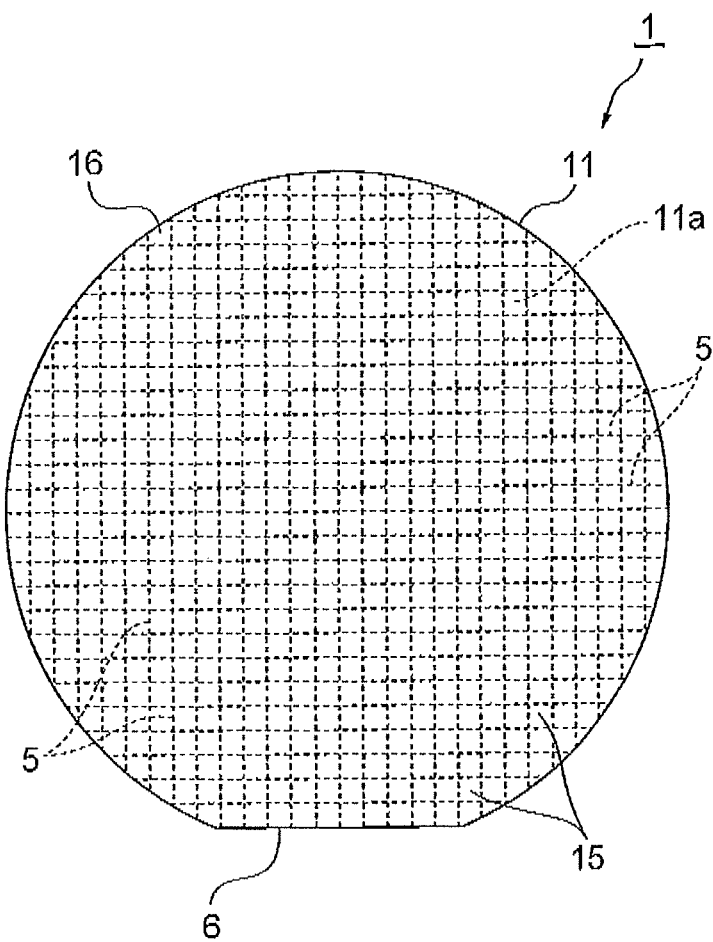
FIG. 7 is a plan view of the object in an embodiment of the laser processing method in accordance with the present invention.

An embodiment of the laser processing method in accordance with the present invention will now be explained. FIG. 7 is a plan view of the object in an embodiment of the laser processing method in accordance with the present invention. As illustrated in FIG. 7, the object 1 having a planar form comprises a silicon substrate 11 and a functional device layer 16 formed on a front face 11a of the silicon substrate 11.

The functional device layer 16 includes a plurality of functional devices 15 formed into a matrix in directions parallel and perpendicular to an orientation flat 6 of the silicon substrate Examples of the functional devices 15 include semiconductor operating layers formed by crystal growth, light-receiving devices such as photodiodes, light-emitting devices such as laser diodes, and circuit devices formed as circuits.

The lines 5 are formed like grids in the object 1 so as to pass between the functional devices 15, 15 adjacent to each other. The object 1 is cut along the lines 5 into chips, each of which becomes a semiconductor device having one functional device 15.

Figure 8:
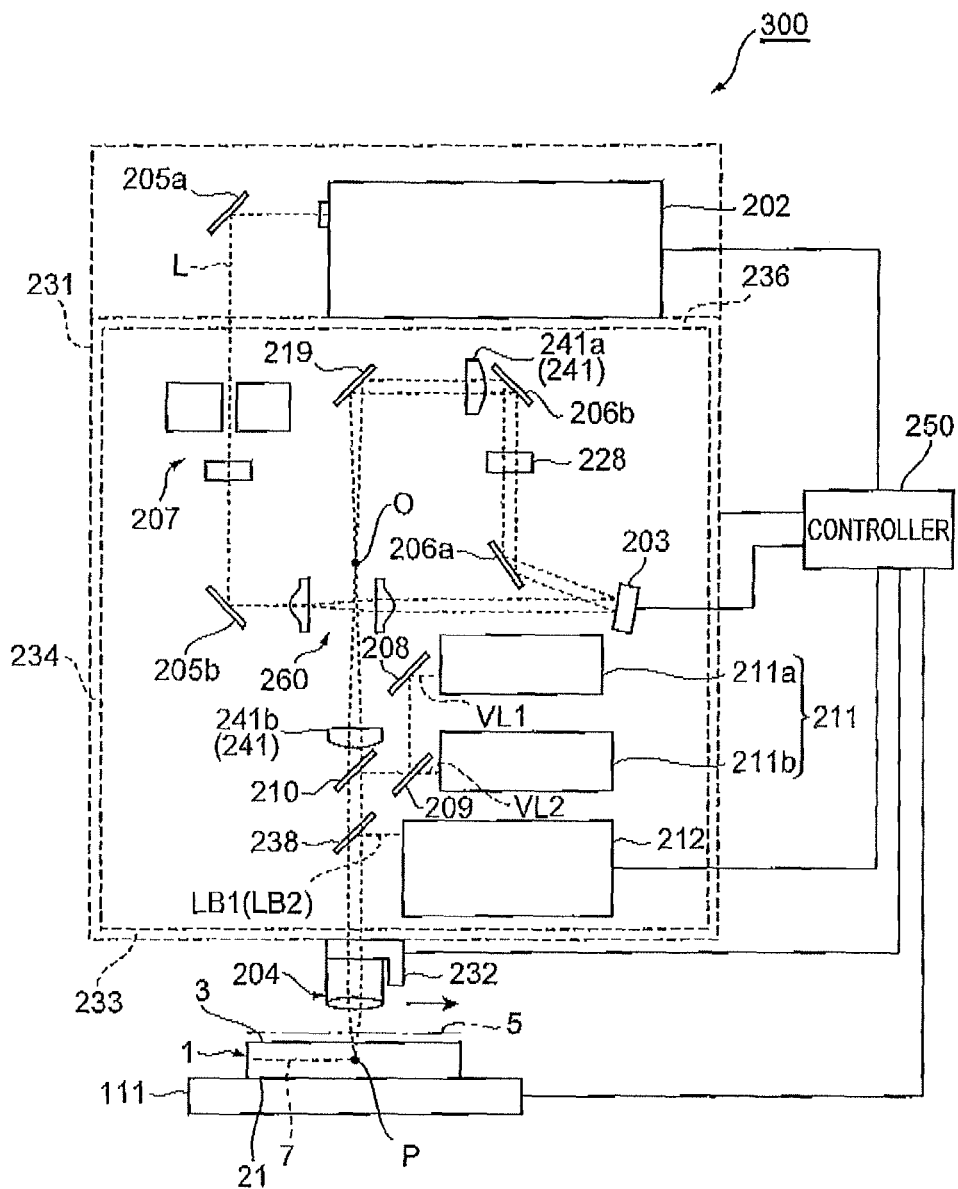
FIG. 8 is a structural diagram of the laser processing device in the embodiment of the laser processing method in accordance with the present invention.

FIG. 8 is a structural diagram illustrating a laser processing device in one embodiment of the laser processing method in accordance with the present invention. As illustrated in FIG. 8, this laser processing device 300 comprises a laser light source 202, a reflective spatial light modulator 203, a 4 f optical system 241, and a condensing optical system 204. The reflective spatial light modulator 203, 4 f optical system 241, and condensing optical system 204 are accommodated in a housing 234, while the laser light source 202 is held in a housing 231 containing the housing 234.

The laser light source 202, for which a fiber laser is used, for example, emits laser light L which is pulsed laser light having a wavelength of 1080 nm or longer, for example. Here, the laser light source 202 is secured to a top plate 236 of the housing 234 with screws or the like so as to emit the laser light L horizontally.

The reflective spatial light modulator 203, for which a spatial light modulator (SLM) made of a liquid crystal on silicon (LCOS) is used, for example, modulates the laser light L emitted from the laser light source 202. Here, the reflective spatial light modulator 203 modulates the laser light L horizontally incident thereon, while reflecting it obliquely upward with respect to the horizontal direction.

FIG. 9 is a partial sectional view of the reflective spatial light modulator in the laser processing device of FIG. 8. As illustrated in FIG. 9, the reflective spatial light modulator 203 comprises a silicon substrate 213, a drive circuit layer 914, a plurality of pixel electrodes 214, a reflecting film 215 such as a dielectric multilayer mirror, an alignment film 999a, a liquid crystal layer 216, an alignment film 999b, a transparent conductive film 217, and a transparent substrate 218 such as a glass substrate, which are stacked in this order.

The transparent substrate 218 has a front face 218a extending along an XY plane, while the front face 218a constitutes a front face of the reflective spatial light modulator 203. The transparent substrate 218 is mainly composed of a light-transmitting material such as glass, for example, and transmits therethrough the laser light L having a predetermined wavelength incident thereon from the front face 218a of the reflective spatial light modulator 203 to the inside of the latter. The transparent conductive film 217 is formed on a rear face 218b of the transparent substrate 218 and mainly composed of a conductive material (e.g., ITO) which transmits therethrough the laser light L.

The plurality of pixel electrodes 214 are arranged two-dimensionally according to the arrangement of a plurality of pixels on the silicon substrate 213 along the transparent conductive film 217. Each pixel electrode 214 is made of a metal material such as aluminum, for example, while its front face 214a is processed flat and smooth. The plurality of pixel electrodes 214 are driven by an active matrix circuit provided with the drive circuit layer 914.

The active matrix circuit is disposed between the plurality of pixel electrodes 214 and the silicon substrate 213 and controls the voltage applied to the pixel electrodes 214 according to a light image to be issued from the reflective spatial light modulator 203. An example of such an active matrix circuit has a first driver circuit for controlling pixel rows each aligning in the X direction and a second driver circuit for controlling pixel columns each aligning in the Y direction, which are not depicted, and is constructed such that a controller 250 applies a predetermined voltage to the pixel electrode 214 of a pixel designated by both of the driver circuits.

The alignment films 999a, 999b are arranged on both end faces of the liquid crystal layer 216, respectively, so as to align a group of liquid crystal molecules in a fixed direction. As the alignment films 999a, 999b, those made of a polymer material such as polyimide, whose surfaces coming into contact with the liquid crystal layer 216 have been subjected to rubbing, for example, are employed.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when the active matrix circuit applies a voltage to a given pixel electrode 214, an electric field is formed between the transparent conductive film 217 and this pixel electrode 214.

The electric field is applied to the reflecting film 215 and the liquid crystal layer 216 at a ratio of their respective thicknesses. The alignment direction of liquid crystal molecules 216a changes according to the magnitude of the electric field applied to the liquid crystal layer 216. The laser light L entering the liquid crystal layer 216 through the transparent substrate 218 and transparent conductive film 217, if any, is modulated by the liquid crystal molecules 216a while passing through the liquid crystal layer 216, then reflected by the reflecting film 215, and thereafter modulated again by the liquid crystal layer 216 before being taken out.

This adjusts the wavefront of the laser light L incident on and transmitted through a modulation pattern (image for modulation), so that individual rays constituting the laser light L vary in phases of components in a predetermined direction orthogonal to their advancing direction.

Returning to FIG. 8, the 4 f optical system 241 adjusts the wavefront form of the laser light L modulated by the reflective spatial light modulator 203. The 4 f optical system 241 has first and second lenses 241a, 241b.

The lenses 241a, 242b are arranged between the reflective spatial light modulator 203 and the condensing optical system 204 such that the distance (optical path length) between the reflective spatial light modulator 203 and the first lens 241a equals the focal length f1 of the first lens 241a, the distance (optical path length) between the condensing optical system 204 and the second lens 241b equals the focal length f2 of the lens 241b, the distance (optical path length) between the first and second lenses 241a, 241b equals f1+f2, and the first and second lenses 241a, 241b constitute a double-telecentric optical system. This 4 f optical system 241 can inhibit the laser light L modulated by the reflective spatial light modulator 203 from changing its wavefront form through spatial propagation and thereby increasing aberration.

The condensing optical system 204 converges the laser light L modulated by the 4 f optical system 241 into the object 1. The condensing optical system 204, which includes a plurality of lenses, is placed on a bottom plate 233 of the housing 231 while interposing therebetween a drive unit 232 composed of a piezoelectric device and the like.

The laser processing apparatus 300 also comprises a surface observation unit 211 for observing the front face 3 of the object 1 and an AF (AutoFocus) unit 212 for finely adjusting the distance between the condensing optical system 204 and the object 1, which are accommodated in the housing 231.

The surface observation unit 211 has an observation light source 211a for emitting visible light VL1 and a detector 211b for receiving and detecting reflected light VL2 of the visible light VL1 reflected by the front face 3 of the object 1. In the surface observation unit 211, the visible light VL1 emitted from the observation light source 211a is reflected by a mirror 208 and dichroic mirrors 209, 210 and transmitted through a dichroic mirror 238, so as to be converged by the condensing optical system 204 to the object. The reflected light VL2 reflected by the front face 3 of the object 1 is converged by the condensing optical system 204, so as to be transmitted through and reflected by the dichroic mirrors 238, 210, respectively, and then transmitted through the dichroic mirror 209, so as to be received by the detector 211b.

The AF unit 212 emits AF laser light LB1 and receives and detects reflected light LB2 of the AF laser light LB1 reflected by the front face 3 of the object 1, thereby acquiring displacement data of the front face 3 (position (height) data of the front face 3 in the thickness direction of the object 1) along the line 5. Then, when forming the modified region 7, the AF unit 212 drives the drive unit 232 according to thus obtained displacement data, so as to move the condensing optical system 204 to and fro in its optical axis along undulations of the front face 3 of the object 1.

The laser processing apparatus 300 further comprises the controller 250, constituted by CPU, ROM, RAM, and the like, for controlling the laser processing apparatus 300. The controller 250 controls the laser light source 202, so as to adjust the output, pulse width, and the like of the laser light L emitted from the laser light source 202. When forming the modified region 7, the controller 250 controls the positions of the housing 231 and stage 111 and the driving of the drive unit 232 so that a simultaneous converging position of the laser light L relatively moves along the line 5 while being located at a predetermined distance from the front face 3 of the object 1.

When forming the modified region 7, the controller 250 also applies a predetermined voltage between each pixel electrode 214 and the transparent conductive film 217, so as to cause the liquid crystal layer 216 to display a predetermined modulation pattern. This allows the reflective spatial light modulator 203 to modulate the laser light L desirably.

A case where the object 1 is processed by the above-mentioned laser processing apparatus 300 will now be explained. Here, a case where the planar object 1 is irradiated with the laser light L while locating the converging point P within the object 1 so as to form the modified region 7 to become a starting point region for cutting along the line 5 will be explained by way of example.

First, an expandable tape is attached to a rear face 21 of the object 1, and the object 1 is mounted on the stage 111. Subsequently, while irradiating the object 1 with the laser light L in a pulsating manner from the front face 3 employed as the laser light irradiation surface, the object 1 is moved relative to (scanned with) the laser light L along the line 5, so as to form the modified region 7.

That is, in the laser processing device 300, the laser light L emitted from the laser light source 202 advances horizontally within the housing 231 and then is reflected downward by a mirror 205a, whereby its light intensity is adjusted by an attenuator 207. Thereafter, the laser light L is horizontally reflected by a mirror 205b and, with its intensity distribution homogenized by a beam homogenizer 260, enters the reflective spatial light modulator 203.

The laser light L incident on the reflective spatial light modulator 203 is transmitted through and modulated according to the modulation pattern displayed on the liquid crystal layer 216 and then is emitted obliquely upward with respect to the horizontal direction. Subsequently, the laser light L is reflected upward by a mirror 206a and then, after its polarization direction is changed by a half-wave plate 228 so as to orient along the line 5, horizontally by a mirror 206b, so as to enter the 4 f optical system 241.

Subsequently, the wavefront form of the laser light L is adjusted so that it enters the condensing optical system 204 as parallel light. Specifically, the laser light L is transmitted through and converged by the first lens 241a and then reflected downward by a mirror 219, so as to diverge through a confocal point O. The diverged laser light L is transmitted through the second lens 241b, so as to be converged again to become parallel light.

The laser light L passes through the dichroic mirrors 210, 238 in sequence, so as to enter the condensing optical system 204, thereby being converged into the object 1 mounted on the stage 111. As a result, a modified spot is formed at a predetermined depth in the thickness direction within the object 1.

Then, the converging point P of the laser light L is relatively moved along the line 5, so that the modified region 7 is formed by a plurality of modified spots. Thereafter, the expandable tape is expanded, so as to cut the object 1 along the line 5 from the modified region 7 acting as a starting point region for cutting, whereby a plurality of cut chips are obtained as semiconductor devices (e.g., memories, ICs, light-emitting devices, and light-receiving devices).

Figure 10:
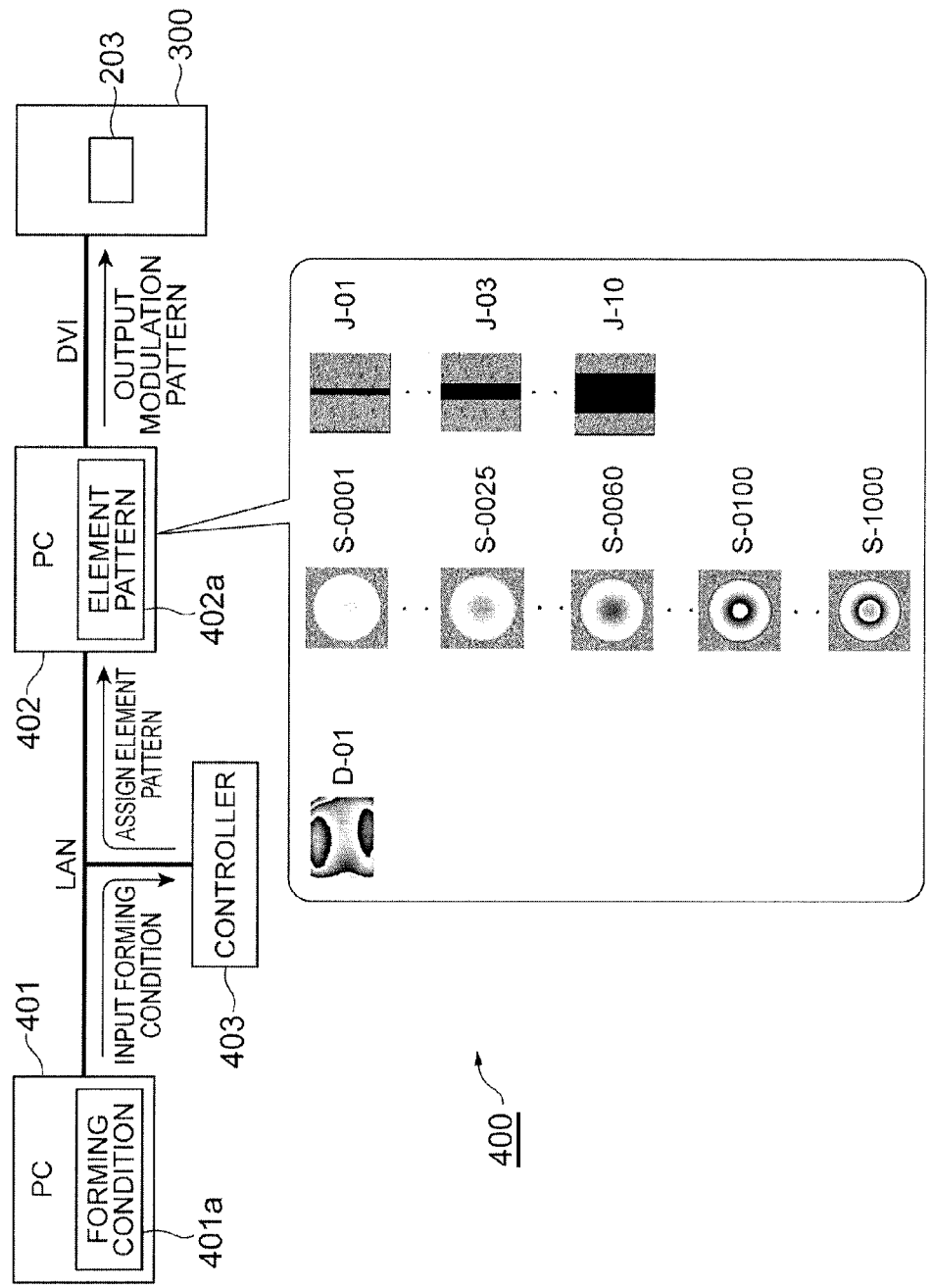
FIG. 10 is a structural view of a laser processing system equipped with the laser processing device of FIG. 8.

A laser processing system 400 equipped with the above-mentioned laser processing device 300 will now be explained. As illustrated in FIG. 10, the laser processing system 400 comprises personal computers (hereinafter referred to as "PCs") 401, 402, a controller 403, and the laser processing device 300. As mentioned above, the laser processing device 300 irradiates the object 1 with the laser light L modulated by the reflective spatial light modulator 203, so as to form the modified region 7 in the object 1.

A storage unit (a memory, a hard disk, or the like) 401a of the PC 401 stores conditions for forming the modified region 7 for the object 1 as a database. When a user inputs a desirable forming condition by operating the PC 401, this forming condition is fed into the controller 403 through a LAN (Local Area Network).

When fed with a condition for forming the modified region 7 for the object 1, the controller (pattern assignment means) 403 chooses one or a plurality of element patterns for the modified region according to the forming condition and assigns the chosen element patterns to the PC 402 through the LAN. Here, the element patterns are patterns to become elements for a modulation pattern for subjecting the laser light to a predetermined modulation in the reflective spatial light modulator 203 in the laser processing device 300, while a plurality of kinds of element patterns are stored as a database in a storage unit (a memory, a hard disk, or the like) 402a of the PC 402.

The storage unit (pattern storage means) 402a stores an individual difference correction pattern (D-01) for correcting an individual difference occurring in the laser processing device 300 (e.g., a distortion occurring in the liquid crystal layer 216 in the reflective spatial light modulator 203) as an element pattern. The storage unit 402a also stores spherical aberration correction patterns (S-0001 to S-1000) for correcting the spherical aberration occurring at the converging point P of the laser light L as element patterns. Since the spherical aberration occurring at the converging point P of the laser light L varies depending on materials of the object 1 and the distance from the laser light entrance surface of the object 1 to the converging point P of the laser light L, the spherical aberration correction patterns are set with the material and distance serving as parameters and stored in the storage unit 402a.

Figure 11:
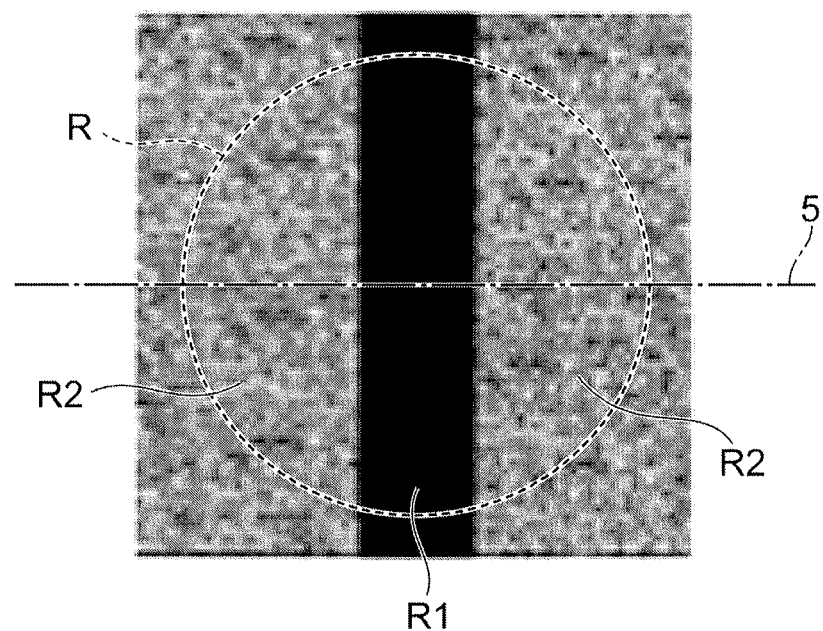
FIG. 11 is a diagram illustrating a quality pattern used in the laser processing system of FIG. 10.

The storage unit 402a further stores quality patterns (J-01 to J-10) as element patterns. As illustrated in FIG. 11, each quality pattern has a first brightness region R1 extending in a direction substantially orthogonal to the line 5 and second brightness regions R2 located on both sides of the first brightness region R1 in the extending direction of the line 5.

In the case where the modified regions 7 are formed at a position closer to the rear face 21 of the object 1, a position closer to the front face 3 of the object 1, and an intermediate position between the position closer to the rear face 21 and the position closer to the front face 3 in the order of the position closer to the rear face 21, the intermediate position, and the position closer to the front face 3 (or in the order of the position closer to the front face 3, the intermediate position, and the position closer to the rear face 21), the quality pattern is used when forming the modified region 7 at the intermediate position. That is, the quality pattern is used when forming the modified region 7 at the intermediate position after forming the modified region at the position closer to the rear face 21 but before forming the modified region at the position closer to the front face 3 (or after forming the modified region at the position closer to the front face 3 but before forming the modified region at the position closer to the rear face 21).

Returning to FIG. 10, the PC (pattern creation means) 402 reads one or a plurality of kinds of element patterns for the modified region 7 from the storage unit 402a according to the assignment of element patterns by the controller 403. That is, according to the condition for forming the modified region 7 for the object 1, the PC 402 acquires one or a plurality of kinds of element patterns for the modified region 7 from the storage unit 402a.

When one kind of element pattern is acquired, the PC 402 employs the one kind of element pattern as a modulation pattern for forming the modified region 7 corresponding thereto. When a plurality of kinds of element patterns are acquired, the PC 402 employs a composite pattern combining the plurality of element patterns as the modulation pattern for forming the modified region 7 corresponding thereto. After thus creating the modulation pattern, the PC 402 outputs the modulation pattern in association with the modified region 7 to the laser processing device 300 through a DVI (Digital Visual Interface).

When forming a plurality of kinds of modified regions 7 in the object 1 (e.g., when a plurality of rows of modified regions 7 juxtaposed in the thickness direction of the object 1 are formed with respect to one line to cut 5), the PC 402 creates a modulation pattern for each of all the kinds of modified regions 7 and then outputs the modulation pattern in association with its corresponding modified region 7 to the laser processing device 300.

The above-mentioned quality pattern will now be explained in more detail. As illustrated in FIG. 11, in the extending direction of the line 5, the width of first brightness region R1 is at a ratio of 20% to 50% of the width of an effective region R for modulating the laser light L in the modulation pattern. However, in the extending direction of the line 5, the width of the first brightness region R1 may be narrower than the width of each of the second brightness regions R2 (see, for example, J-01 in FIG. 10) or wider than the latter (see, for example, J-10 in FIG. 10). The effective region R of the quality pattern is a region corresponding to the part of laser light L incident on the condensing optical system 204 (the part incident on the entrance pupil of the condensing optical system 204).

Any of the average brightness of the first brightness region R1 and that of the second brightness regions R2 may be higher than the other as long as they differ from each other. From the viewpoint of increasing the difference in brightness between the first and second brightness regions, however, it will be preferred if the average brightness of the first brightness region R1 and that of the second brightness region R2 deviate from each other by 128 gradations when the brightness of each pixel constituting the quality pattern is expressed by 256 gradations.

Figure 12:
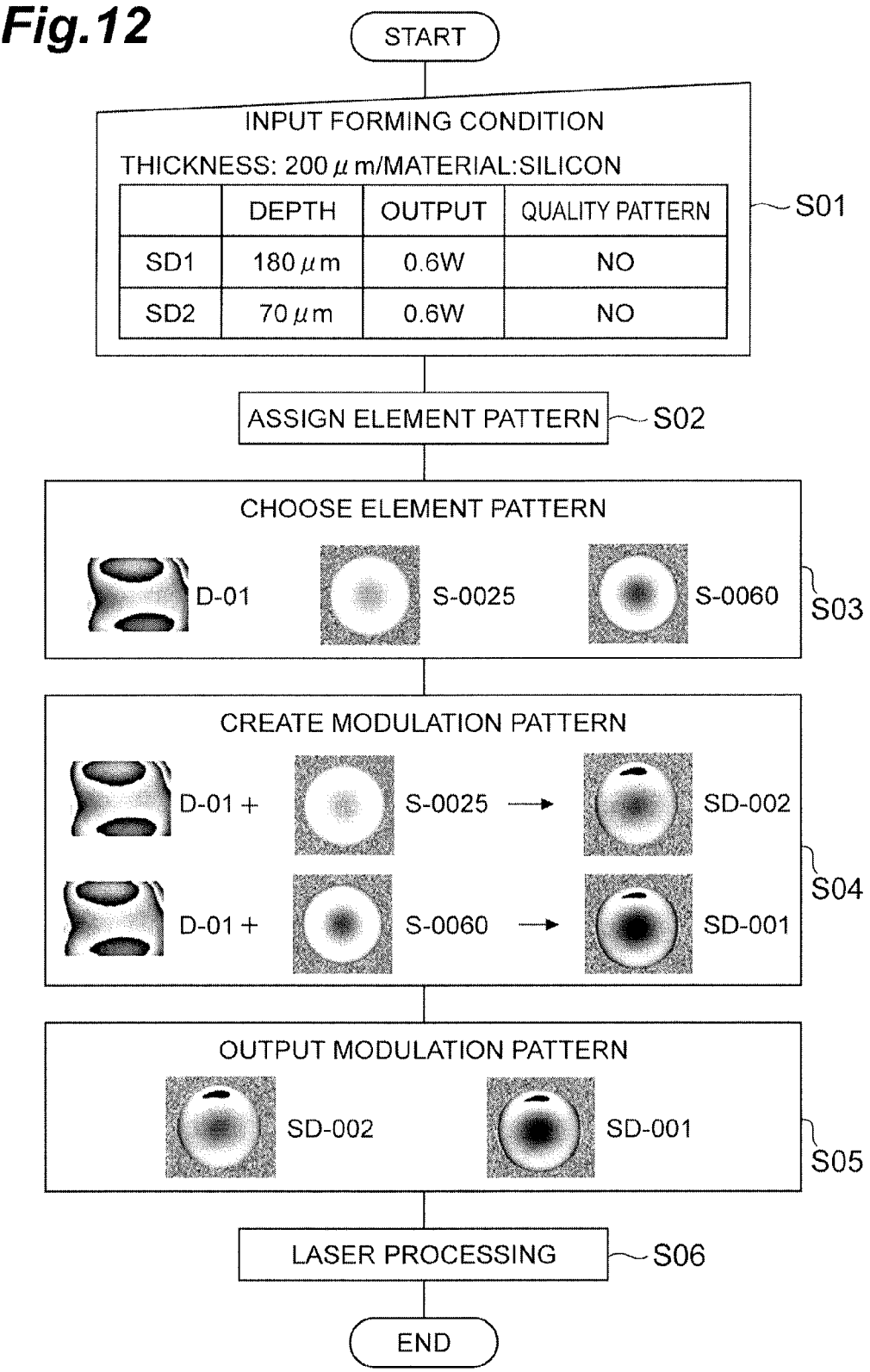
FIG. 12 is a flowchart illustrating an example of laser processing methods performed in the laser processing system of FIG. 10.

An example of laser processing methods performed in the above-mentioned laser processing system 400 will now be explained with reference to FIG. 12. First, a user operates the PC 401, so as to input a condition for forming the modified region 7 for the object 1 (step S01). Here, the thickness and material of the object 1 are set to 200 μm and silicon, respectively. Two rows of modified regions SD1, SD2 are set as a plurality of rows of modified regions 7 formed in juxtaposition in the thickness direction of the object 1 with respect to one line to cut 5. For forming the modified region SD1, the distance (depth) from the laser light entrance surface of the object 1 to the converging point P of the laser light L and the output of the laser light L are set to 180 μm and 0.6 W, respectively. For forming the modified region SD2, the distance and output are set to 70 μm and 0.6 W, respectively.

When the condition for forming the modified region 7 for the object 1 is fed into the controller 403, the latter chooses one or a plurality of element patterns for each of the modified regions SD1, SD2 according to the forming condition and assigns the element patterns in association with their corresponding modified regions SD1, SD2 to the PC 402 (step S02). This allows the PC 402 to acquire appropriate element patterns easily and reliably.

When the element patterns are assigned for each of the modified regions SD1, SD2, the PC 402 chooses the element patterns in association with their corresponding modified regions SD1, SD2 from the storage unit 402a (step S03). Here, the individual difference correction pattern D-01 and spherical aberration correction pattern S-0025 are chosen as element patterns in association with the modified region SD2, while the individual difference correction pattern D-01 and spherical aberration correction pattern S-0060 are chosen as element patterns in association with the modified region SD1.

Subsequently, for forming the modified regions SD1, SD2, the PC 402 combines a plurality of kinds of element patterns in association with each of the modified regions SD1, SD2 corresponding thereto and employs the resulting composite pattern as a modulation pattern (step S04). Here, the individual difference correction pattern D-01 and spherical aberration correction pattern S-0025 are combined so as to create a modulation pattern SD-002 for forming the modified region SD2, while the individual difference correction pattern D-01 and spherical aberration correction pattern S-0060 are combined so as to create a modulation pattern SD-001 for forming the modified region SD1.

Next, the PC 402 outputs thus created modulation patterns SD-001, SD-002 in association with their corresponding modified regions SD1, SD2 to the laser processing device 300 (step S05). When fed with the modulation patterns SD-001, SD-002 in association with their corresponding modified regions SD1, SD2, the laser processing device 300 performs laser processing (step S06).

More specifically in the laser processing device 300, when forming the modified region SD1, the modulation pattern SD-001 is displayed on the liquid crystal layer 216 of the reflective spatial light modulator 203 through the controller 250, whereby the laser light L is modulated by the modulation pattern SD-001. When forming the modified region SD2, the modulation pattern SD-002 is displayed on the liquid crystal layer 216 of the reflective spatial light modulator 203 through the controller 250, whereby the laser light L is modulated by the modulation pattern SD-002.

Since the modulation pattern thus includes the individual difference correction pattern and spherical aberration correction pattern when forming each of the modified regions SD1, SD2, states of forming the modified regions can be inhibited from fluctuating because of the individual difference occurring in the laser processing device 300 and the spherical aberration generated at the converging point P of the laser light L. Here, it is preferable to form the modified region SD2 located closer to the laser light entrance surface of the object 1 after forming the modified region SD1 located farther from the laser light entrance surface of the object 1.

Figure 13:
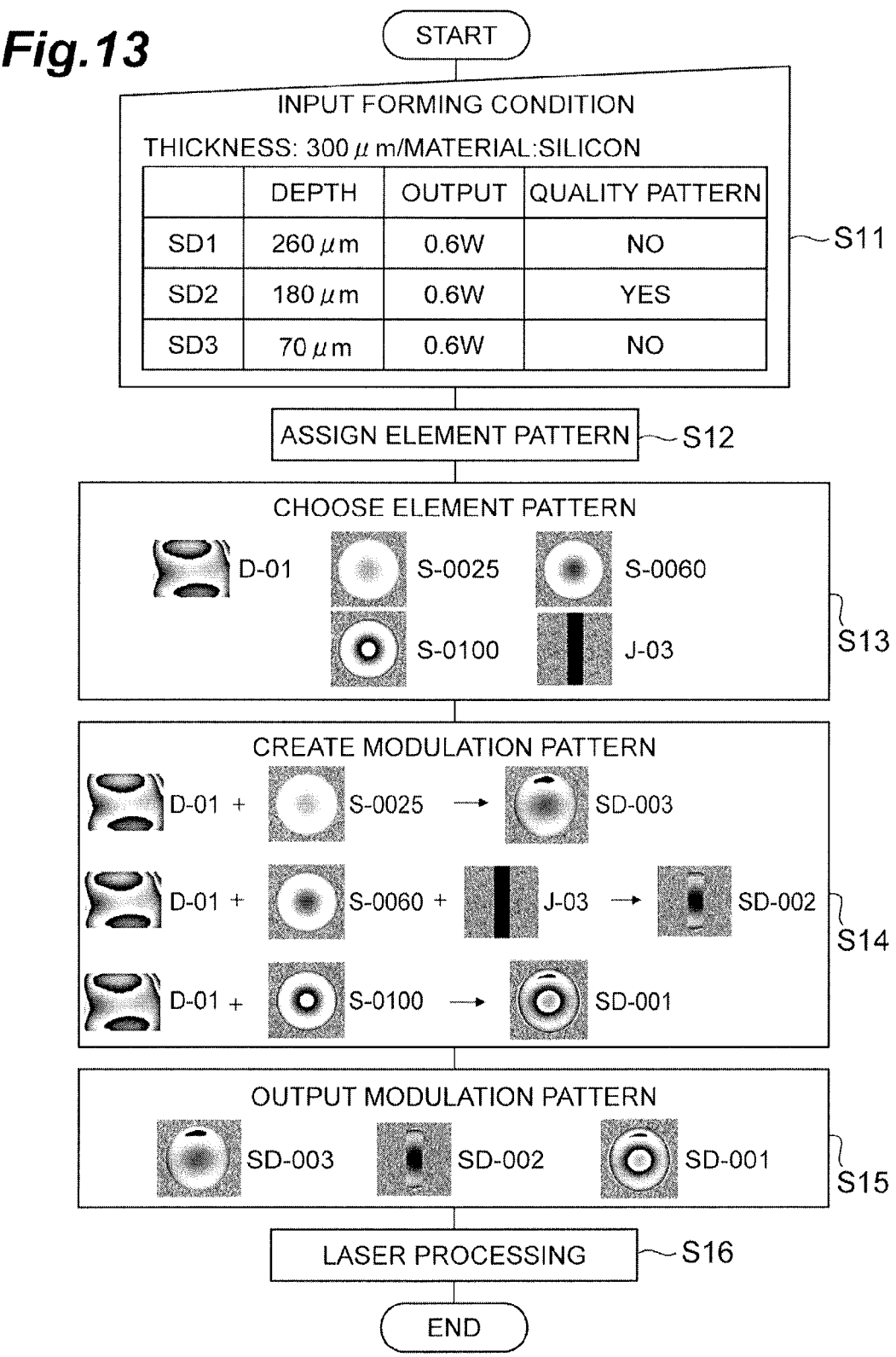
FIG. 13 is a flowchart illustrating another example of laser processing methods performed in the laser processing system of FIG. 10.

Another example of laser processing methods performed in the above-mentioned laser processing system 400 will now be explained with reference to FIG. 13. First, the user operates the PC 401, so as to input a condition for forming the modified region 7 for the object 1 (step S11). Here, the thickness and material of the object 1 are set to 300 μm and silicon, respectively. Three rows of modified regions SD1, SD2, SD3 are set as a plurality of rows of modified regions 7 formed in juxtaposition in the thickness direction of the object 1 with respect to one line to cut 5. For forming the modified region SD1, the distance (depth) from the laser light entrance surface of the object 1 to the converging point P of the laser light L and the output of the laser light L are set to 260 μm and 0.6 W, respectively. For forming the modified region SD2, the distance and output are set to 180 μm and 0.6 W, respectively. For forming the modified region SD3, the distance and output are set to 70 μm and 0.6 W, respectively. Here, the quality pattern is set to "yes" for forming the modified region SD2.

When the condition for forming the modified region 7 for the object 1 is fed into the controller 403, the latter chooses one or a plurality of element patterns for each of the modified regions SD1, SD2, SD3 according to the forming condition and assigns the element patterns in association with their corresponding modified regions SD1, SD2, SD3 to the PC 402 (step S12). This allows the PC 402 to acquire appropriate element patterns easily and reliably.

When the element patterns are assigned for each of the modified regions SD1, SD2, SD3, the PC 402 chooses the element patterns in association with their corresponding modified regions SD1, SD2, SD3 from the storage unit 402a (step S13). Here, the individual difference correction pattern D-01 and spherical aberration correction pattern S-0025 are chosen as element patterns in association with the modified region SD3. The individual difference correction pattern D-01, spherical aberration correction pattern S-0060, and quality pattern J-03 are chosen as element patterns in association with the modified region SD2. The individual difference correction pattern D-01 and spherical aberration correction pattern S-0100 are chosen as element patterns in association with the modified region SD1.

Subsequently, for forming the modified regions SD1, SD2, SD3, the PC 402 combines a plurality of kinds of element patterns in association with each of the modified regions SD1, SD2, SD3 corresponding thereto and employs the resulting composite pattern as a modulation pattern (step S14). Here, the individual difference correction pattern D-01 and spherical aberration correction pattern S-0025 are combined so as to create a modulation pattern SD-003 for forming the modified region SD3. The individual difference correction pattern D-01, spherical aberration correction pattern S-0060, and quality pattern J-03 are combined so as to create a modulation pattern SD-002 for forming the modified region SD2. The individual difference correction pattern D-01 and spherical aberration correction pattern S-0100 are combined so as to create a modulation pattern SD-001 for forming the modified region SD1.

Next, the PC 402 outputs thus created modulation patterns SD-001, SD-002, SD-003 in association with their corresponding modified regions SD1, SD2, SD3 to the laser processing device 300 (step S15). When fed with the modulation patterns SD-001, SD-002, SD-003 in association with their corresponding modified regions SD1, SD2, SD3, the laser processing device 300 performs laser processing (step S16).

More specifically in the laser processing device 300, when forming the modified region SD1, the modulation pattern SD-001 is displayed on the liquid crystal layer 216 of the reflective spatial light modulator 203 through the controller 250, whereby the laser light L is modulated by the modulation pattern SD-001. When forming the modified region SD2, the modulation pattern SD-002 is displayed on the liquid crystal layer 216 of the reflective spatial light modulator 203 through the controller 250, whereby the laser light L is modulated by the modulation pattern SD-002. When forming the modified region SD3, the modulation pattern SD-003 is displayed on the liquid crystal layer 216 of the reflective spatial light modulator 203 through the controller 250, whereby the laser light L is modulated by the modulation pattern SD-003.

Since the modulation pattern thus includes the individual difference correction pattern and spherical aberration correction pattern when forming each of the modified regions SD1, SD2, SD3, states of forming the modified regions can be inhibited from fluctuating because of the individual difference occurring in the laser processing device 300 and the spherical aberration generated at the converging point P of the laser light L. Here, it is preferable to form the modified region SD1 farther from the laser light entrance surface of the object 1, the modified region SD2 located in the middle, and the modified region SD3 located closer to the laser light entrance surface of the object 1 in this order.

In the case where the modified regions SD1, SD2, SD3 are formed in this order, the modulation pattern includes the quality pattern in addition to the individual difference correction pattern and spherical aberration correction pattern when forming the modified region SD2 at the intermediate position. Thus modulating the laser light L by using the quality pattern so as to form the modified region SD2 at the intermediate position can prevent fractures from continuously advancing in the thickness direction of the object 1 when forming the modified regions SD1, SD2, SD3 in the thickness direction of the object 1. When a stress is generated in the object 1, fractures generated from the modified region acting as a start point extend in the thickness direction of the object 1 more easily than in the case where the modified region SD2 is not formed at the intermediate position, whereby the object 1 can be cut accurately along the line 5. The modified region SD3 located closer to the laser light entrance surface of the object 1, the modified region SD2 located in the middle, and the modified region SD1 located farther from the laser light entrance surface of the object 1 may also be formed sequentially in this order.

Figure 14:
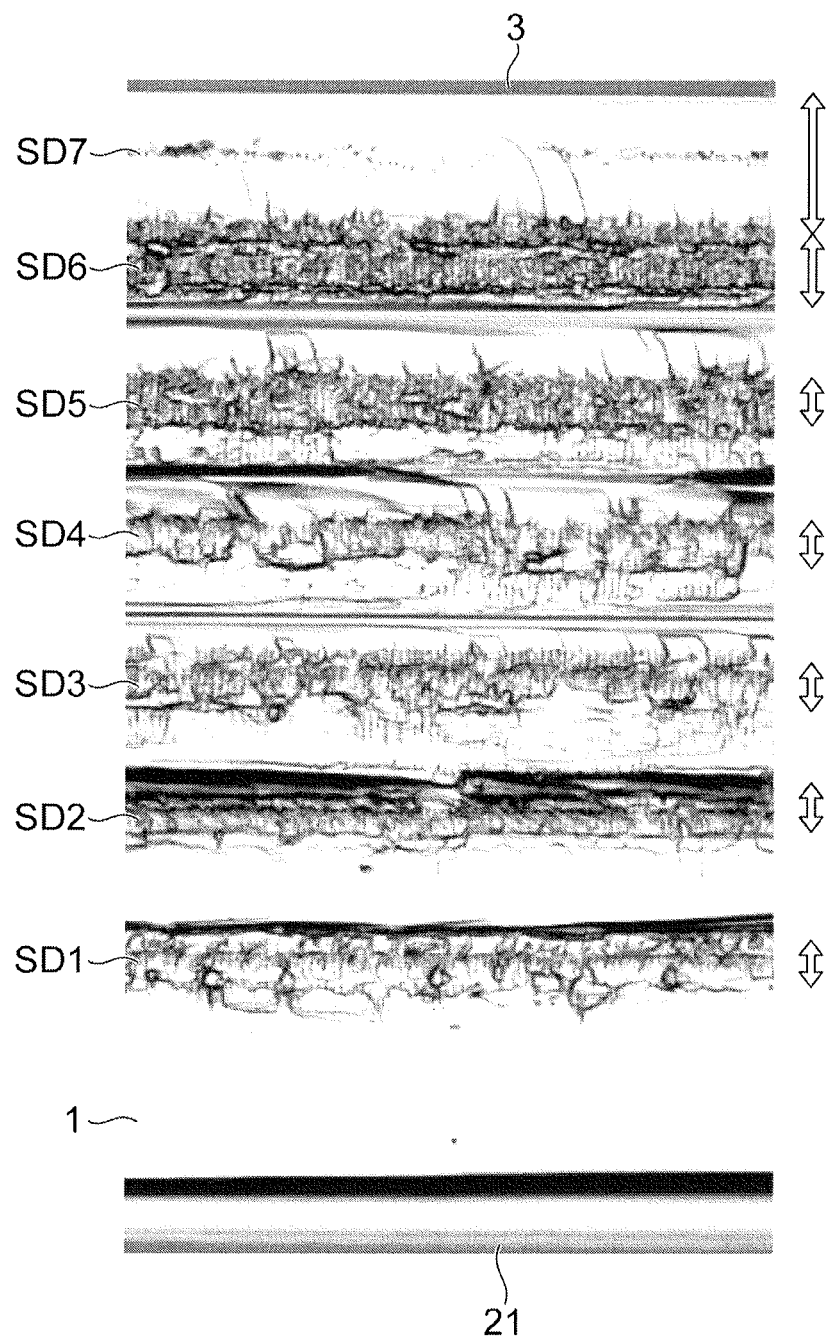
FIG. 14 is a first diagram illustrating a cut section obtained when cutting the object from modified regions acting as a start point.

The modulation patterns (individual correction pattern, spherical aberration correction pattern, and quality pattern) will now be explained. FIG. 14 is a first diagram illustrating a cut section obtained when cutting the object from modified regions acting as a start point. Here, using the front face 3 of the object 1 made of silicon having a thickness of 625 μm as a laser light entrance surface, modified regions SD1 to SD7 were formed in the descending order of their distance from the front face 3. For forming the modified regions SD1 to SD7, a spherical aberration correction pattern which could correct the spherical aberration at the converging point P of the laser light L when forming the modified region SD7 located closest to the front face 3 serving as the laser light entrance surface was used, and the laser light L was modulated by a modulation pattern including the spherical aberration correction pattern in addition to an individual difference correction pattern. As a result, it has been seen as indicated by arrows on the right side of FIG. 14 that fractures generated at the time of forming each of the modified regions SD1 to SD7, the modified regions SD1 to SD5 in particular, are hard to extend in the thickness direction of the object 1.

Figure 15:
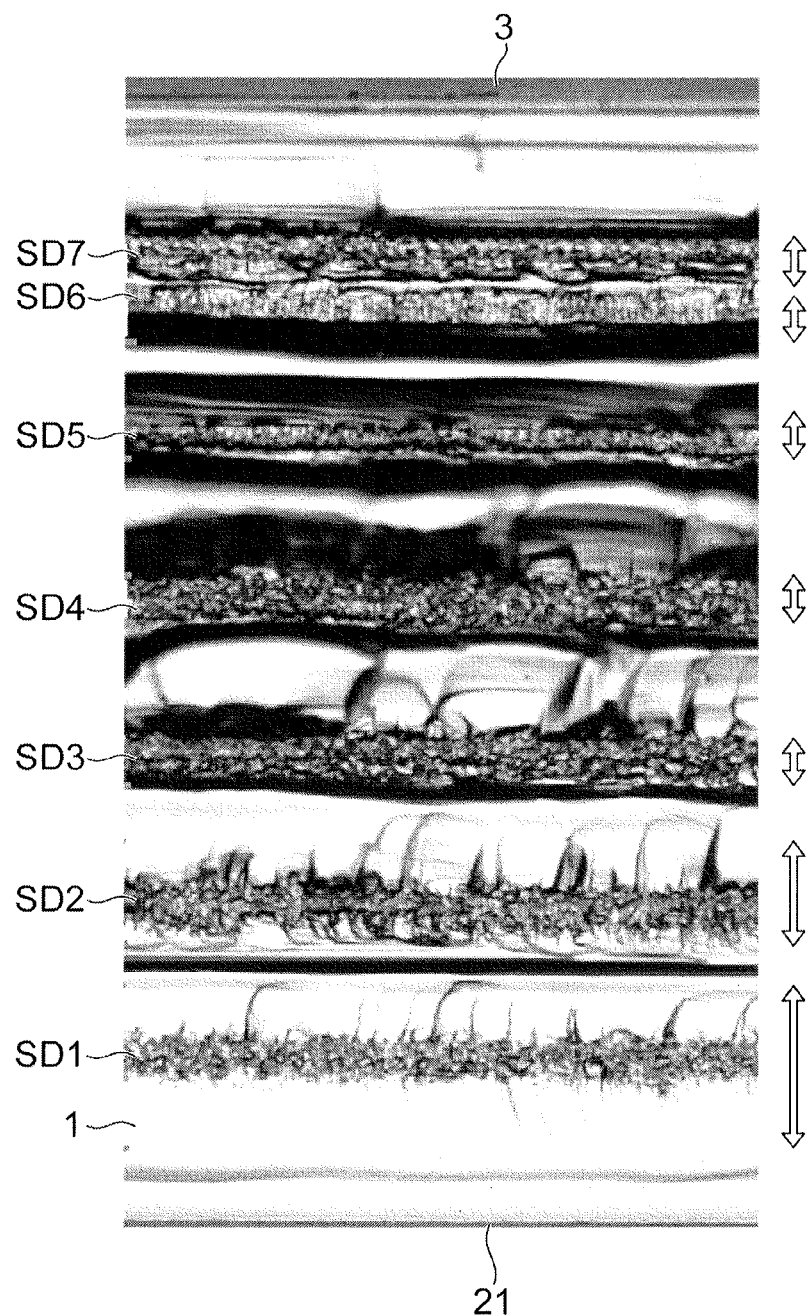
FIG. 15 is a second diagram illustrating a cut section obtained when cutting the object from modified regions acting as a start point.

FIG. 15 is a second diagram illustrating a cut section obtained when cutting the object from modified regions acting as a start point. Here, using the front face 3 of the object 1 made of silicon having a thickness of 625 μm as a laser light entrance surface, modified regions SD1 to SD7 were formed in the descending order of their distance from the front face 3. For forming the modified regions SD1 to SD7, a spherical aberration correction pattern which could correct the spherical aberration at the converging point P of the laser light L when forming the modified region SD7 located closest to the front face 3 serving as the laser light entrance surface was used, and the laser light L was modulated by a modulation pattern including the spherical aberration correction pattern in addition to an individual difference correction pattern. As a result, it has been seen as indicated by arrows on the right side of FIG. 15 that fractures generated at the time of forming each of the modified regions SD1 to SD7, the modified regions SD3 to SD5 in particular, are hard to extend in the thickness direction of the object 1.

Figure 16:
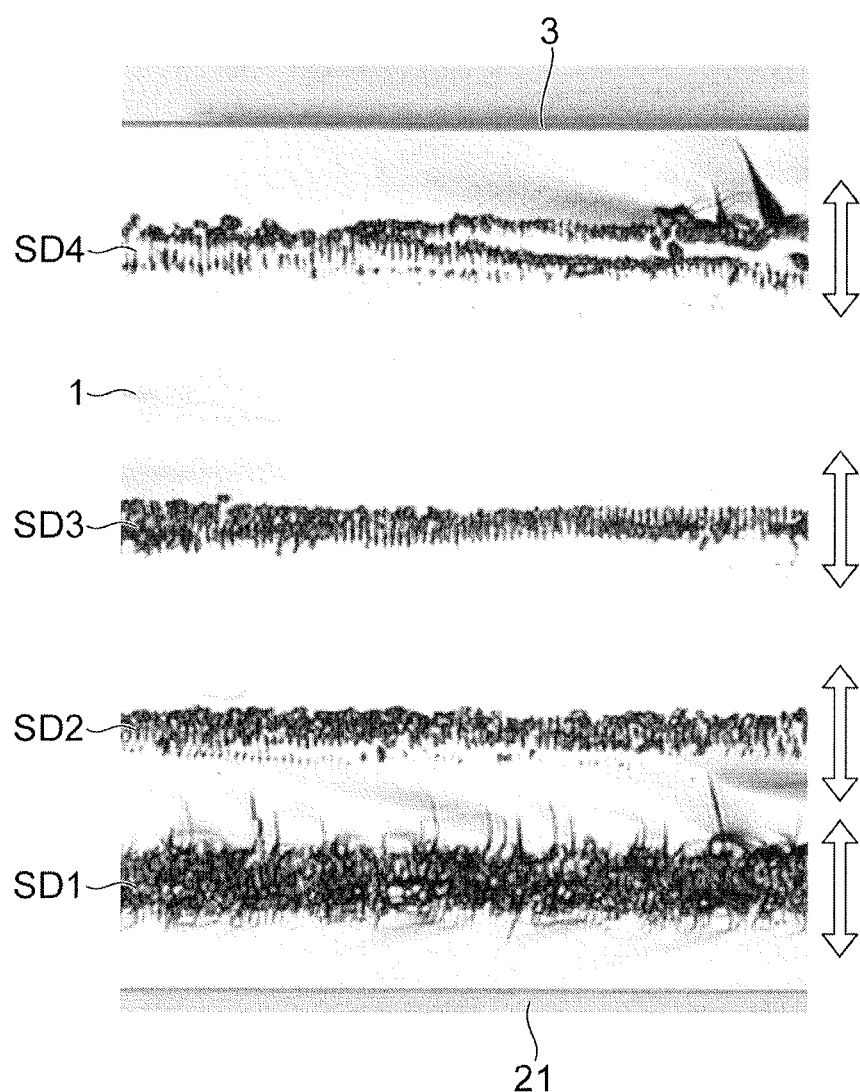
FIG. 16 is a third diagram illustrating a cut section obtained when cutting the object from modified regions acting as a start point.

In view of the results of FIGS. 14 and 15, spherical aberration correction patterns which could correct the spherical aberration at the converging point P of the laser light L when forming the respective modified regions were used (i.e., the spherical aberration correction pattern was changed depending on the modified regions). FIG. 16 is a third diagram illustrating a cut section obtained when cutting the object from modified regions acting as a start point. Here, using the front face 3 of the object 1 made of silicon having a thickness of 400 μm as a laser light entrance surface, modified regions SD1 to SD4 were formed in the descending order of their distance from the front face 3. For forming the modified regions SD1 to SD4, respective spherical aberration correction patterns which could correct the spherical aberration at the converging point P of the laser light L were used, and the laser light L was modulated by modulation patterns including the respective spherical aberration correction patterns in addition to the individual difference correction pattern. As a result, it has been seen as indicated by arrows on the right side of FIG. 16 that fractures generated at the time of forming the modified regions SD1 to SD4 have equal lengths among the modified regions SD1 to SD4 and extend in the thickness direction of the object 1 more easily than in the cases of FIGS. 14 and 15. However, there was a case where the following problem occurred in a part of a cut section.

Figure 17:
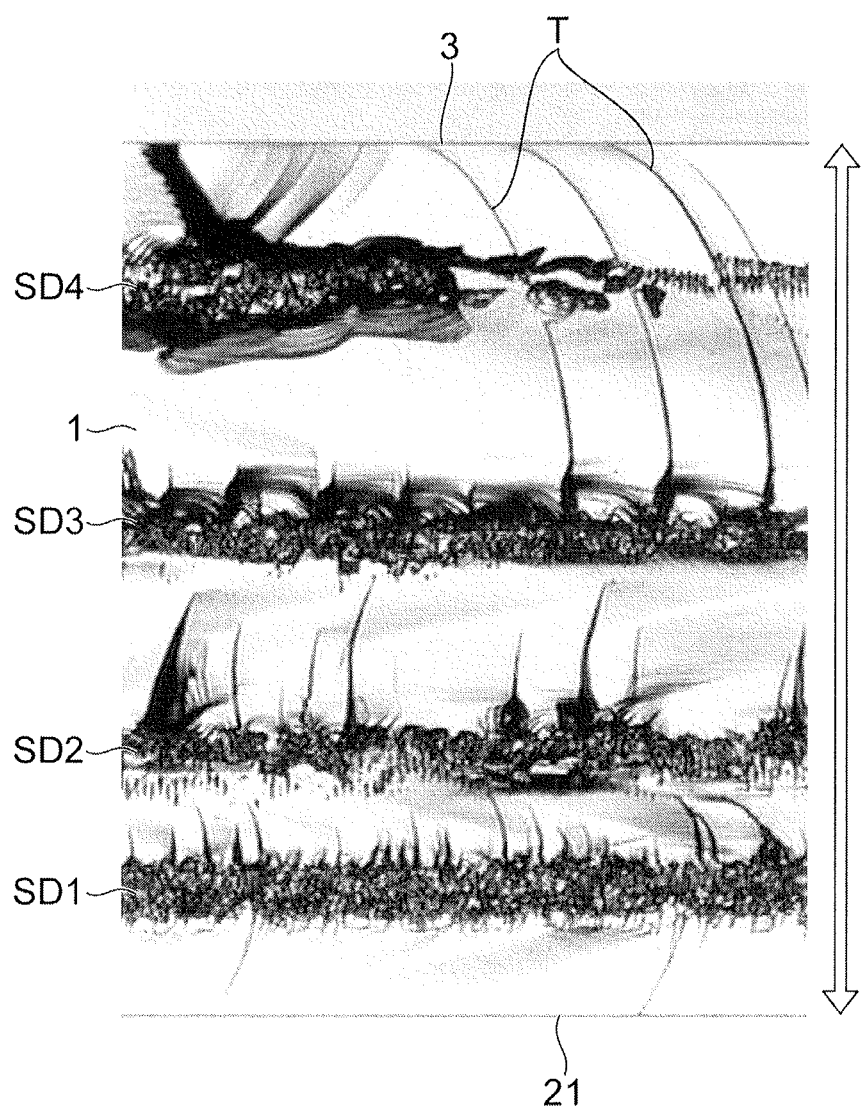
FIG. 17 is a fourth diagram illustrating a cut section obtained when cutting the object from modified regions acting as a start point.

FIG. 17 is a fourth diagram illustrating a cut section obtained when cutting the object from modified regions acting as a start point. While the modified regions SD1 to SD4 were formed under a forming condition equal to that in the case of FIG. 16, fractures continuously advanced in the thickness direction of the object 1 in the process of forming the modified regions SD1 to SD4 in sequence as indicated by the arrow on the right side of FIG. 17. As a result, twist hackles T occurred at the cut section of the object 1 and so forth, whereby the cut section meandered on the front face 3 side in particular.

Figure 18:
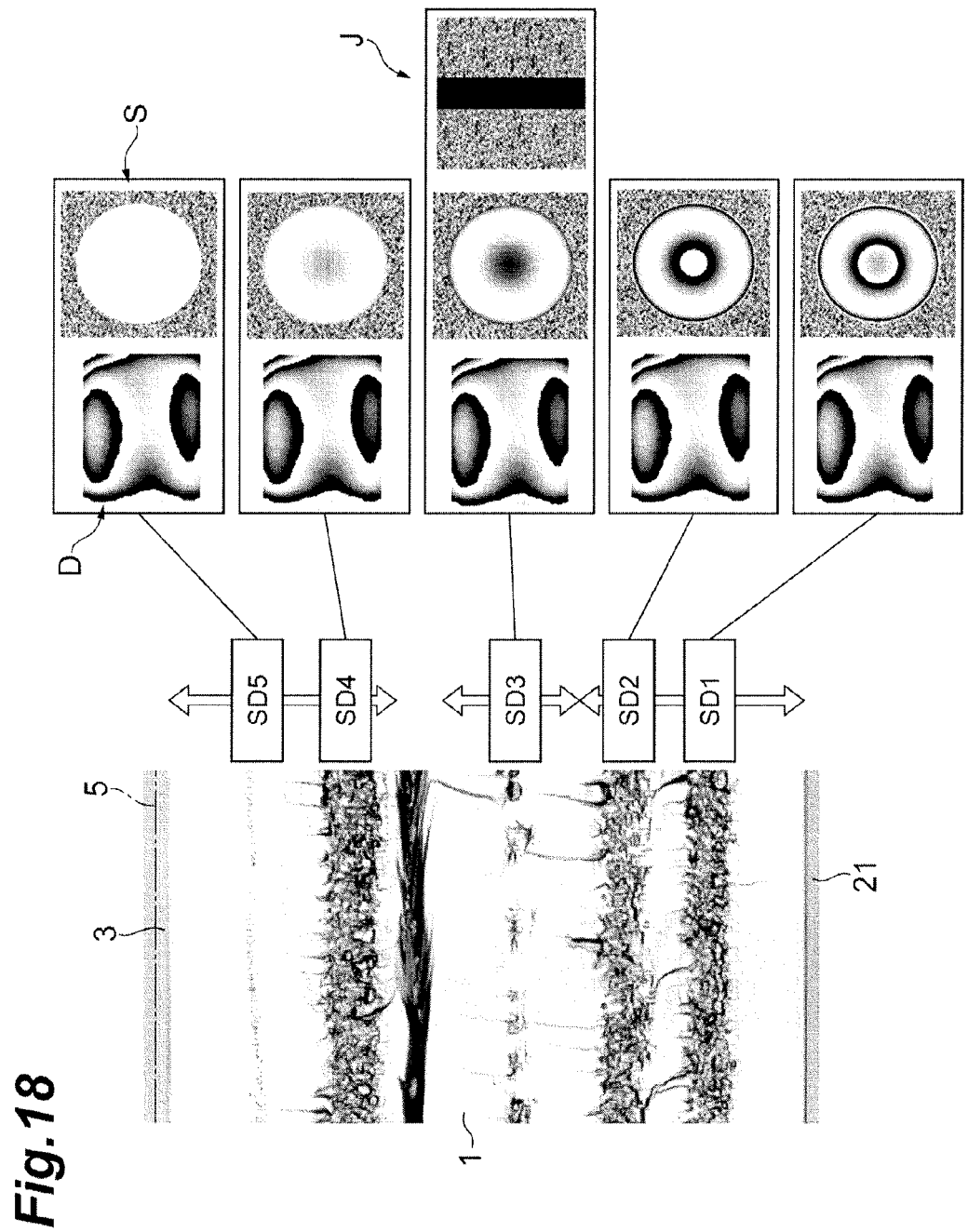
FIG. 18 is a fifth diagram illustrating a cut section obtained when cutting the object from modified regions acting as a start point.

Therefore, a quality pattern was used in addition to the individual difference correction pattern and spherical aberration correction pattern when forming the modified region at the intermediate position. FIG. 18 is a fifth diagram illustrating a cut section obtained when cutting the object from modified regions acting as a start point. Here, using the front face 3 of the object 1 made of silicon having a thickness of 400 μm as a laser light entrance surface, modified regions SD1 to SD5 were formed in the descending order of their distance from the front face 3. For forming the modified regions SD1, SD2 located closer to the rear face 21 and the modified regions SD4, SD5 located closer to the front face 3, respective spherical aberration correction patterns S which could correct the spherical aberration at the converging point P of the laser light L were used, and the laser light L was modulated by modulation patterns including the respective spherical aberration correction patterns S in addition to the individual difference correction pattern D. For forming the modified region SD3 at the intermediate position between the respective positions closer to the rear face 21 and front face 3, the laser light L was modulated by a modulation pattern including a quality pattern J in addition to the individual difference correction pattern D and spherical aberration correction pattern S.

As a result, fractures generated at the time of forming the modified regions SD1, SD2 reached the rear face 21 of the object 1 but failed to join with fractures generated at the time of forming the modified region SD3. Fractures generated at the time of forming the modified regions SD4, SD5 reached the front face 3 of the object 1 but failed to join with the fractures generated at the time of forming the modified region SD3. This has made it possible to reduce the number of rows of modified regions 7 formed in the thickness direction of the object 1 along the line 5, while preventing the accuracy in cutting the object 1 from lowering.

Figure 19:
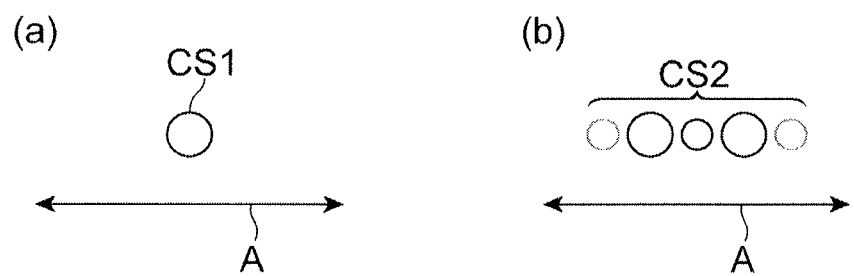
FIG. 19 is a schematic view of converging spots of laser light for forming a modified region.

FIG. 19 is a schematic view of converging spots of laser light for forming a modified region. When the laser light L was modulated by a modulation pattern including an individual difference correction pattern and a spherical aberration correction pattern, a converging spot CS1 of the laser light L became a circular region as illustrated in FIG. 19(a). When the laser light L was modulated by a modulation pattern including a quality pattern in addition to the individual difference correction pattern and spherical aberration correction pattern, on the other hand, a converging spot CS2 of the laser light L attained a form in which a plurality of dot-like regions were juxtaposed along the extending direction A of the line 5 (i.e. the relative moving direction of the laser light L) as illustrated in FIG. 19(b). There were cases where the dot-like regions adjacent to each other partly overlapped and were spaced apart from each other.

This seems to be because of the fact that the laser light L is diffracted in the reflective spatial light modulator 203 by the quality pattern having the first brightness region R1 extending in a direction substantially orthogonal to the line 5 and the second brightness regions R2 located on both sides of the first brightness region R1 in the extending direction of the line S. Irradiation with the laser light L having thus constructed converging spot CS2 can form modified regions 7 which can prevent fractures from continuously advancing in the thickness direction of the object 1 when forming a plurality of rows of modified regions 7 in the thickness direction of the object 1.

As explained in the foregoing, the laser processing method performed in the laser processing system 400 uses the quality pattern having the first brightness region R1 extending in a direction substantially orthogonal to the line 5 and the second regions R2 located on both sides of the first brightness region R1 in the extending direction of the line 5 for modulating the laser light L for forming the modified region 7 at the intermediate position between the position closer to the rear face 21 and the position closer to the front face 3 with respect to the object 1. That is, after forming the modified region 7 at the position closer to the rear face 21 but before forming the modified region 7 at the position closer to the front face 3 while using the front face 3 as the laser light entrance surface (or after forming the modified region 7 at the position closer to the front face 3 but before forming the modified region 7 at the position closer to the rear face 21 while using the rear face 21 as the laser light entrance surface), the modified region 7 is formed at the intermediate position by irradiation with the laser light L modulated by the reflective spatial light modulator 203 according to the modulation pattern including the quality pattern. Even when the laser light L having a wavelength longer than 1064 nm is used in order to reduce the number of rows of modified regions 7, for example, thus forming the modified region 7 at the intermediate position can prevent fractures from continuously advancing in the thickness direction of the object 1 at the time of forming a plurality of rows of modified regions 7 in the thickness direction of the object 1. When a stress is generated in the object 1, for example, a fracture occurring from the modified region 7 acting as a start point extends in the thickness direction of the object 1 more easily than in the case where the modified region 7 is not formed at the intermediate position, whereby the object 1 can be cut accurately along the line 5. Hence, this laser processing method can reduce the number of rows of modified regions 7 formed in the thickness direction of the object 1 along the line 5, while preventing the accuracy in cutting the object 1 from lowering, thereby shortening the takt time.

Here, in the extending direction of the line 5, the width of the first brightness region R1 is preferably at a ratio of 20% to 50% of the width of the effective region R for modulating the laser light L in the modulation pattern. In this case, the modified region 7 that can reliably prevent fractures from continuously advancing in the thickness direction of the object 1 when forming a plurality of rows of modified regions 7 in the thickness direction of the object 1 can be formed at the intermediate position. In the extending direction of the line 5, the width of the first brightness region R1 may be narrower or wider than the width of each of the second brightness regions R2.

Preferably, the laser light L is modulated by the reflective spatial light modulator 203 according to a modulation pattern including a quality pattern, an individual difference correction pattern, and a spherical aberration correction pattern when forming the modified region 7 at the intermediate position and according to a modulation pattern including the individual difference correction pattern and spherical aberration correction pattern when forming the modified regions 7 at the positions closer to the rear face 21 and the front face 3. In this case, the modified regions 7 formed at the intermediate position and the positions closer to the rear face 21 and the front face 3 are easier to generate fractures, whereby the number of rows of modified regions 7 formed in the thickness direction of the object 1 along the line 5 can be reduced more reliably.

Preferably, the laser light L has a wavelength of 1080 nm or longer. This makes the object 1 exhibit a higher transmittance for the laser light L, so that the modified regions 7 formed at the intermediate position and the positions closer to the rear face 21 and the front face 3 are easier to generate fractures, whereby the number of rows of modified regions 7 formed in the thickness direction of the object 1 along the line 5 can be reduced more reliably.

Cutting the object 1 along the line 5 from the above-mentioned modified regions 7 acting as a start point can accurately cut the object 1 along the line 5. Manufacturing a semiconductor device by cutting the object 1 can yield a highly reliable semiconductor device.

Though preferred embodiments of the present invention have been explained in the foregoing, the present invention is not limited thereto.

For example, as illustrated in FIG. 20, the number of rows of modified regions 7 formed at positions closer to the rear face 21, the number of rows of modified regions 7 formed at positions closer to the front face 3, and the number of rows of modified regions 7 formed at intermediate positions can be varied according to the thickness and material of the object 1. The number of rows of modified regions 7 formed at positions closer to the rear face 21 can be determined such that fractures can be generated from the modified regions 7 to the rear face 21, while the number of rows of modified regions 7 formed at positions closer to the front face 3 can be determined such that fractures can be generated from the modified regions 7 to the front face 3. The number of rows of modified regions 7 formed at intermediate positions can be determined such that fractures can be prevented from advancing continuously in the thickness direction of the object 1 when forming a plurality of rows of modified regions 7 in the thickness direction of the object 1.

Not only the quality pattern, individual difference correction pattern, and spherical aberration correction pattern, an astigmatism correction pattern for correcting the astigmatism at the converging point P of the laser light L and the like may also be used as element patterns to become elements of a modulation pattern.

The reflective spatial light modulator is not limited to the LCOS-SLM, but may also be a MEMS-SLM, a DMD (deformable mirror device), or the like. The spatial light modulator is not limited to the reflective one, but may be a transmissive one. Examples of the spatial light modulator include those of liquid crystal cell and LCD types. The reflective spatial light modulator 203 may use the reflection of pixel electrodes of the silicon substrate instead of the dielectric multilayer mirror.

INDUSTRIAL APPLICABILITY

The present invention can reduce the number of rows of modified regions formed in the thickness direction of the object while preventing the accuracy in cutting the object from lowering.

REFERENCE SIGNS LIST

1 . . . object to be processed; 3 . . . front face; 5 . . . line to cut; 7 . . . modified region; 21 . . . rear face; 203 . . . reflective spatial light modulator; R1 . . . first brightness region; R2 . . . second brightness region; L . . . laser light; P . . . converging point

The invention claimed is:

1. A laser processing method of irradiating a planar object to be processed with laser light so as to form a modified region to become a starting point region for cutting in the object along a line to cut the object;

wherein, when relatively moving a converging point of the laser light along the line while using one main face of the object as a laser light entrance surface, so as to form modified regions at a position closer to the other main face of the object, a position closer to the one main face, and an intermediate position between the position closer to the other main face and the position closer to the one main face, for forming the modified region at the intermediate position after forming the modified region at the position closer to the other main face but before forming the modified region at the position closer to the one main face, the laser light is modulated by a spatial light modulator according to a modulation pattern including a quality pattern having a first brightness region extending in a direction intersecting the line and second brightness regions adjacent to both sides of the first brightness region in an extending direction of the line.

2. A laser processing method according to claim 1, wherein, in the extending direction of the line, the width of the first brightness region is at a ratio of 20% to 50% of the width of an effective region for modulating the laser light in the modulation pattern.

3. A laser processing method according to claim 2, wherein, in the extending direction of the line, the width of the first brightness region is narrower than the width of each of the second brightness regions.

4. A laser processing method according to claim 2, wherein, in the extending direction of the line, the width of the first brightness region is wider than the width of each of the second brightness regions.

5. A laser processing method according to claim 1, wherein the modulation pattern includes the quality pattern, an individual difference correction pattern for correcting an individual difference occurring in a laser processing device, and a spherical aberration correction pattern for correcting a spherical aberration occurring according to a material of the object and a distance from the laser light entrance surface of the object to the converging point when forming the modified region at the intermediate position; and wherein the laser light is modulated by a spatial light modulator according to a modulation pattern including the individual difference correction pattern and spherical aberration correction pattern when forming the modified regions at the position closer to the other main face and the position closer to the one main face.

6. A laser processing method according to claim 1, wherein the laser light has a wavelength of 1080 nm or longer.

7. A laser processing method according to claim 1, wherein the object is cut along the line from the modified region acting as a start point.

8. A laser processing method according to claim 7, wherein a semiconductor device is manufactured by cutting the object.

9. A laser processing method according to claim 1, wherein, when forming the modified region at the intermediate position, the laser light has a converging spot shaped by a plurality of dot-like regions juxtaposed along the extending direction of the line.

* * * * *